US012243504B2

(12) United States Patent
Kawakami et al.

(10) Patent No.: US 12,243,504 B2
(45) Date of Patent: Mar. 4, 2025

(54) DEFLECTION CORRECTION DEVICE FOR STRINGED INSTRUMENT NECKS

(71) Applicants: YAMAUCHI MATEX CORPORATION, Fukui (JP); HIGH RIVER ENTERPRISES LTD., North Vancouver (CA)

(72) Inventors: Yusuke Kawakami, North Vancouver (CA); Michitaka Fukuoka, Fukui (JP)

(73) Assignees: YAMAUCHI MATEX CORPORATION, Fukui (JP); HIGH RIVER ENTERPRISES LTD., North Vancouver (CA)

( * ) Notice: Subject to any disclaimer, the term of this patent is extended or adjusted under 35 U.S.C. 154(b) by 0 days.

(21) Appl. No.: 17/915,214

(22) PCT Filed: May 24, 2022

(86) PCT No.: PCT/JP2022/021230
§ 371 (c)(1),
(2) Date: Sep. 28, 2022

(87) PCT Pub. No.: WO2023/067838
PCT Pub. Date: Apr. 27, 2023

(65) Prior Publication Data

US 2024/0212653 A1 Jun. 27, 2024

(30) Foreign Application Priority Data

Oct. 21, 2021 (JP) ................................. 2021-172419

(51) Int. Cl.
*G10D 3/06* (2020.01)

(52) U.S. Cl.
CPC ..................................... *G10D 3/06* (2013.01)

(58) Field of Classification Search
CPC .. G10D 3/06; G10D 1/08; G10D 3/00; G10D 1/00
See application file for complete search history.

(56) References Cited

U.S. PATENT DOCUMENTS 3,901,119 A * 8/1975 Siminoff .................. G10D 1/05 984/115
4,084,476 A 4/1978 Rickard
(Continued)

FOREIGN PATENT DOCUMENTS

JP H03-33488 U 4/1991
JP H07-077974 A 3/1995
(Continued)

OTHER PUBLICATIONS

PCT/ISA/210, "International Search Report for PCT International Application No. PCT/JP2022/021230," Aug. 9, 2022.

*Primary Examiner* — Kimberly R Lockett
(74) *Attorney, Agent, or Firm* — HAUPTMAN HAM, LLP

(57) ABSTRACT

A deflection correction device includes a first rod-like member provided in stringed instrument necks; fixing members attached to end parts of the first rod-like member; a screw hole formed so as to pass through the fixing member; and a second rod-like member provided with a screw shaft part screwed in the screw hole, and attached to the fixing member. The fixing members includes fitting grooves fitted on the end parts of the first rod-like member; shaft holes passing through the end parts of the first rod-like member from side surfaces of the fixing members; and a shaft member inserted in the screw holes. The fixing members are fixed to the end parts of the first rod-like member together with the shaft member, and by rotation of the second rod-like (Continued)

member, both the fixing members are pushed in a direction drawn to or away from each other.

8 Claims, 2 Drawing Sheets

(56) References Cited

U.S. PATENT DOCUMENTS

| | | | |
|---|---|---|---|
| 4,167,133 | A | 9/1979 | Adams, Jr. |
| 4,235,145 | A | 11/1980 | Adams, Jr. |
| 4,308,780 | A | 1/1982 | Boucher |
| 5,465,642 | A | 11/1995 | Goto |
| 5,696,334 | A | 12/1997 | Terry |
| 6,259,008 | B1 | 7/2001 | Eddinger et al. |
| 6,979,766 | B2 | 12/2005 | Goto |
| 7,507,887 | B1 | 3/2009 | Blanchard |
| 8,962,956 | B2 | 2/2015 | Allred, III et al. |
| 2003/0010181 | A1 | 1/2003 | Takeuchi |

FOREIGN PATENT DOCUMENTS

| | | | |
|---|---|---|---|
| JP | 2736860 | B2 | 1/1998 |
| JP | 2003-29741 | A | 1/2003 |
| WO | 02/093545 | A1 | 11/2002 |

* cited by examiner

【FIG. 1】
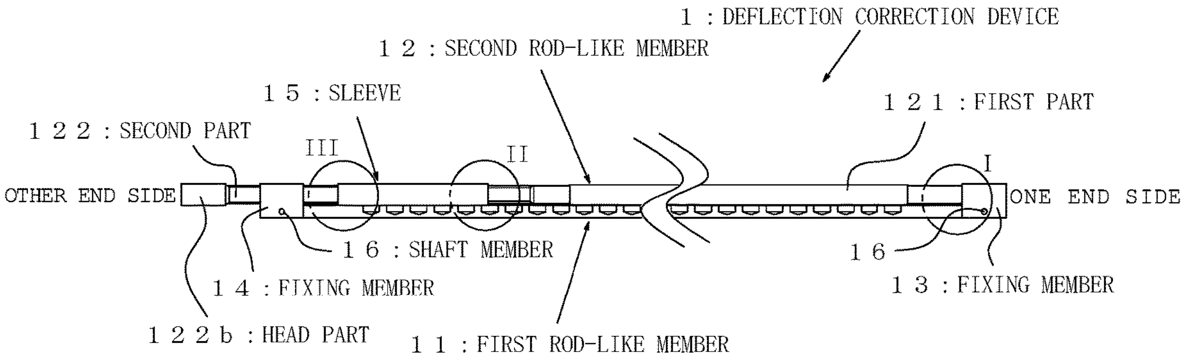
【FIG. 2】
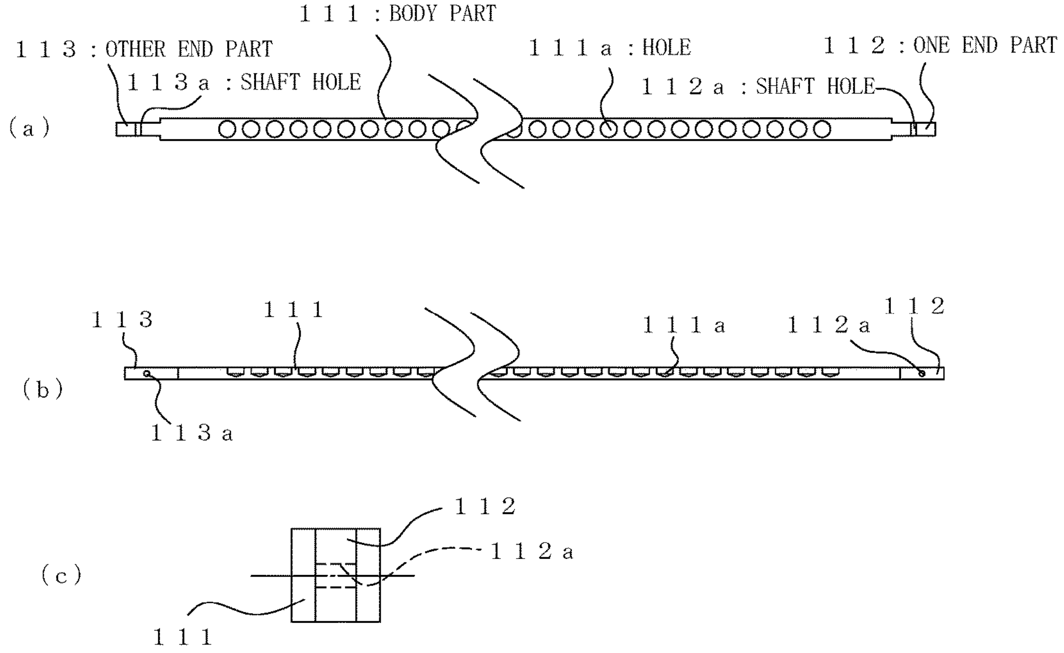

【FIG. 3】
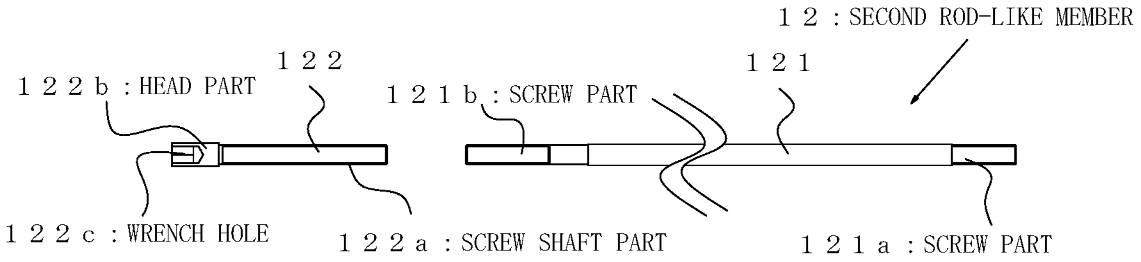
【FIG. 4】
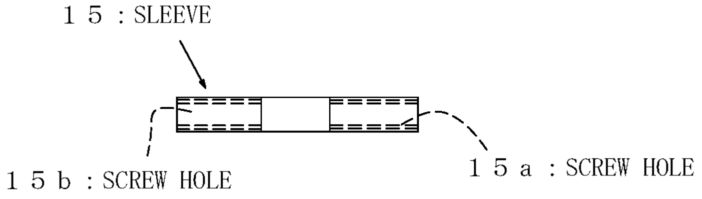
【FIG. 5】
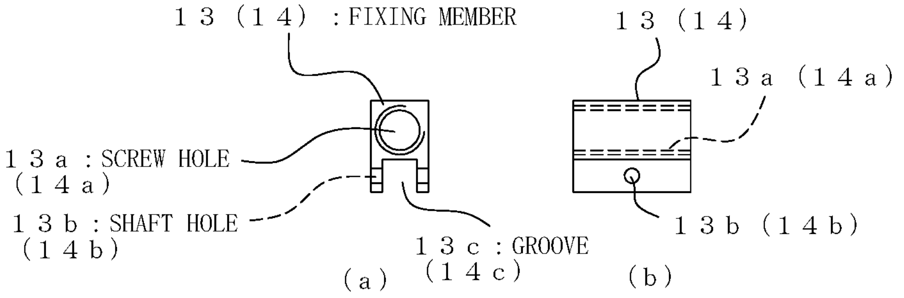
【FIG. 6】
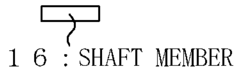

DEFLECTION CORRECTION DEVICE FOR STRINGED INSTRUMENT NECKS

RELATED APPLICATIONS

The present application is National Phase of International Application No. PCT/JP2022/021230 filed May 24, 2022, and claims priority from Japanese Application No. 2021-172419, filed Oct. 21, 2021, the disclosure of which is hereby incorporated by reference herein in its entirety.

TECHNICAL FIELD

The present invention relates to a deflection correction device for stringed instrument necks which device corrects neck deflection caused by strings or the like in stringed instruments such as a guitar, a base guitar, a ukulele, a violin, a cello, a mandolin and a contrabass.

BACKGROUND ART

In a stringed instrument such as a guitar, a base guitar, a ukulele, a violin, a cello, a mandolin or a contrabass, when the instrument is stringed, the neck readily deflects toward the front side of the instrument because of the tension of the strings or the like. To correct such neck deflection, a deflection correction device is embedded in the neck in the direction of the length thereof.

In a typical deflection correction device, by combining two rod-like members and increasing or decreasing the length of one rod-like member by the action of a screw, the other rod-like member is bent concavely or convexly so that this deflection of the rod-like member offsets the deflection of the neck caused by the tension of the stings or the like.

For example, in a neck deflection correction device described in Patent Literature 1, as shown in FIGS. 1A to 1D of Patent Literature 1, a block-like fixing member 20 is attached to the base end part of a first rod-like member 12 by bonding or the like, and a first male screw 25*t* of a screw member 25 is screwed in the opposite direction of a second rod-like member 14 into a screw hole (first female screw 22*w*) formed so as to pass through the fixing member 20.

Moreover, a second male screw 14*t* of the second rod-like member 14 is screwed in a second female screw 25*w* formed in the first male screw 25*t*. As shown in FIGS. 1A and 1C, the second rod-like member 14 is slightly curved in advance. The neck deflection correction device 10 having the above-described structure is embedded in a long groove 2*s* of a neck 2. Then, by rotating the screw member 25 in a loosening direction, the second rod-like member 14 is pulled to deflect the first rod-like member 12 convexly as shown in FIG. 1B, and by rotating the screw member 25 in a tightening direction, the second rod-like member 14 is pushed in a compressing direction to deflect the first rod-like member 12 concavely as shown in FIG. 1D. For this reason, the deflection of the neck 2 by a string 4 can be corrected by adjusting the degree of the concave curve or the convex curve of the first rod-like member 12.

CITATION LIST

Patent Literature

Patent Literature 1: JP 2003-29741 A (see FIG. 5)

DISCLOSURE OF THE INVENTION

Problem to be Solved by the Invention

However, in the conventional neck deflection correction device as described in Patent Literature 1, since the fixing member 20 coupling the first rod-like member 12 and the second rod-like member 14 is attached to the base end part of the first rod-like member 12 by bonding or the like, the bonding or the like between the fixing member 20 and the base end part of the first rod-like member 12 is readily peeled off after repeated corrections by rotating the screw member 25. While it is considered to attach the fixing member 20 and the base end part of the first rod-like member 12 by welding or brazing instead of bonding or the like, in either case, if the bonded part, the welded part or the brazed part is broken by repeated loading, the neck deflection correction device becomes non-functional, which makes it necessary to replace the deflection correction device.

However, it is not easy to replace the deflection correction device embedded in the neck and it is necessary to disassemble the neck or the stringed instrument itself, which requires an excessive amount of time and cost. For this reason, the life of the deflection correction device is required to be as long as possible, and is considered ideal if it is as long as the life of the stringed instrument.

Moreover, while the deflection correction device described in Patent Literature 1 is capable of correcting deflection in one direction, that is, deflection where the neck is curved upward by the tension of the strings or the like (hereinafter, referred to as convex deflection), it is incapable of correcting deflection where the neck is curved downward (hereinafter, referred to as concave deflection).

The present invention is made in view of requirements and problems as described above, and an object thereof is to provide a deflection correction device in which the coupling of the two rod-like members is made firmer, the fixed parts such as the bonded, welded or brazed parts do not readily break, even if these fixed parts break, the need for replacement does not arise over a long period of time by maintaining the coupling of the two rod-like members over a predetermined period of time and both the concave and convex deflections can be corrected.

Means for Solving the Problem

To attain the above-mentioned object, a deflection correction device of the present invention is, as recited in claim 1, provided with in a deflection correction device that corrects deflection of a neck of a stringed instrument: a first rod-like member provided in a length direction of the neck; one end side fixing member attached to one end side of the first rod-like member and the other end side fixing member attached to the other end side thereof; a screw hole formed so as to pass through the other end side fixing member; and a second rod-like member provided along the first rod-like member, provided with a screw shaft part screwed in the screw hole on the other end side, and having one end part thereof attached to the one end side fixing member, the one end side fixing member and the other end side fixing member are provided with: fitting grooves fitted on the one end part and the other end part of the first rod-like member; shaft holes passing through the one end part and the other end part of the first rod-like member from side surfaces of the one end side fixing member and the other end side fixing member; and a shaft member inserted in the shaft holes, the one end side fixing member and the other end side fixing member are fixed to the one end part and the other end part together with the shaft member, and by the screwing between the screw hole and the screw shaft part accompanying rotation of the second rod-like member, the one end side fixing member and the other end side fixing member are pushed in a direction in which they are drawn to each other or in a direction in which they are moved away from each other.

As recited in claim 2, the one end part and the other end part of the first rod-like member are formed to be angular in cross section, and the fitting grooves of the one end side fixing member and the other end side fixing member are formed in a U shape that is fitted on the one end part and the other end part, which enables the one end side fixing member and the other end side fixing member to be fixed to the first rod-like member more firmly.

As recited in claim 3, the following may be performed: A screw hole is formed on the one end side fixing member, a screw part is formed on the one end part of the second rod-like member, and the second rod-like member is screwed in the screw hole of the one end side fixing member. By doing this, the load that moves the one end side fixing member and the other end side fixing member in a direction in which they are drawn to each other or in a direction in which they are moved away from each other which load is caused by the screwing between the screw shaft part or the screw part and the screw hole occurring when the second rod-like member is rotated can be distributed to the other end side fixing member and the one end side fixing member. Moreover, the displacement amount at the part where the screw shaft part or the screw part and the screw hole are screwed can also be distributed to the other end side fixing member and the one end side fixing member. Consequently, the breakage of the parts where the one end side fixing member and the other end side fixing member, and the first rod-like member are fixed can be suppressed over a longer period of time.

As recited in claim 4, the following may be performed: The second rod-like member is divided into at least two of a first part and a second part, the first part and the second part are coupled by a coupling member, one end part of the first part is coupled to the one end side fixing member, and the second part where the screw shaft part is formed is screwed in the screw hole of the other end side fixing member.

By doing this, the attachment of the second part to the first part is facilitated.

In this case, as recited in claim 5, the following may be performed: One end part of the first part is fixed to the one end side fixing member, and a screw part is formed on the other end part of the first part and is screwed in a screw hole on one end side of the coupling member. Moreover, as recited in claim 6, the following may be performed: A screw part is formed on one end part of the first part and is screwed in the screw hole formed on the one end side fixing member, the other end part of the first part is fixed to one end side of the coupling member, and the screw shaft part of the second part is screwed in the screw hole of the other end side fixing member. Moreover, as recited in claim 7, the following may be performed: One end part of the first part is fixed to the one end side fixing member, the other end part of the first part is fixed to one end side of the coupling member, and one end part of the screw shaft part of the second part is screwed in a screw hole formed on the other end side of the coupling member.

With the structure as recited in claims 5 to 7, by rotating the second part, not only the second part is moved back and forth by the screwing between the screw shaft part of the second part and the screw hole of the other end side fixing member but also by the screwing between the screw part of the other end part of the first part and the screw hole of the coupling member, the screwing between the screw part of the one end part of the first part and the screw hole of the one end side fixing member or the screwing between the screw shaft part of the second part and the screw hole of the coupling member, the load that moves the one end side fixing member and the other end side fixing member in a direction in which they are drawn to each other or in a direction in which they are moved away from each other can be distributed to two parts and the displacement amount can also be distributed to two parts. Consequently, the breakage of the parts where the one end side fixing member and the other end side fixing member, and the first rod-like member are fixed can be suppressed over a longer period of time.

Further, as recited in claim 8, a covering member that prevents the first rod-like member and the second rod-like member from being in contact with each other is formed on at least one of the first rod-like member and the second rod-like member.

By forming such a covering member, abnormal noise can be prevented from being caused by the first rod-like member and the second rod-like member made of a metal being in contact with each other when the instrument is played.

Advantageous Effects of the Invention

Since the present invention is structured as described above, not only a convex deflection but also a concave deflection can be corrected. Moreover, the parts where the first rod-like member and the one end side and other end side fixing members are fixed do not readily break, so that the life of the deflection correction device can be further increased. Further, even if the fixing parts break, since the coupling between the first rod-like member and the second rod-like member can be maintained by the shaft member, the life of the deflection correction device can be further increased.

Moreover, by rotating the second rod-like member, the load acting on the one end side fixing member and the other end side fixing member on both ends, and the displacement amount are distributed to two parts, so that the life of the deflection correction device can be further increased.

As described above, according to the present invention, a deflection correction device can be provided that is capable of correcting not only a convex deflection but also a concave deflection and has the life as long as the life of the musical instrument.

BEST MODE FOR CARRYING OUT THE INVENTION

Hereinafter, a preferred embodiment of a deflection correction device of the present invention will be described in detail with reference to the drawings.

FIGS. 1 to 6 are related to the embodiment of the deflection correction device of the present invention, and FIG. 1 is an assembly front view of the deflection correction device. FIGS. 2A to 6 are explanatory views of components of the deflection correction device of FIG. 1. FIGS. 2A to 2C are related to a first rod-like member, FIG. 2A is a plan view thereof, FIG. 2B is a front view thereof, and FIG. 2C is an enlarged right side view thereof, FIG. 3 is a front view of a second rod-like member, FIG. 4 is a front view of a sleeve, FIGS. 5A and 5B are related to fixing members, FIG. 5A is a side view thereof, FIG. 5B is a front view thereof, and FIG. 6 is a side view of a shaft member.

In the following description, "one end side" indicates the right side of FIG. 1, whereas "the other end side" indicates the left side of FIG. 1.

[First Rod-Like Member 11]

The deflection correction device 1 is formed of a combination of a first rod-like member 11 and a second rod-like member 12, and concavely or convexly deflects the first rod-like member 11 by adjusting the length of the second rod-like member 12 relative to the first rod-like member 11 so as to be loner or shorter, thereby correcting neck deflection.

The first rod-like member 11 has, as shown in FIGS. 2A to 2C, a rod-like body part 111 being angular in cross section, one end part 112 being angular in cross section and formed so as to protrude on one end (the right side end in the figures) of the body part 111, and the other end part 113 being angular in cross section and formed so as to protrude on the other end (the left side end in the figures) of the body part 111. While the first rod-like member 11 may be made of a metal such as stainless steel or steel, it is preferably made of a titanium alloy (for example, 15-3-3-3 titanium alloy).

As shown in FIGS. 2A to 2C, the one end part 112 and the other end part 113 of the first rod-like member 11 are narrower than the body part 111, and are fitted in U-shaped grooves 13*c* and 14*c* of fixing members 13 and 14 described later.

On the body part 111, a plurality of holes 111*a* is formed in the length direction for the purpose of weight reduction and adjustment of the ease of deflection and the deflection form. On the side surfaces of the one end part 112 and the other end part 113, shaft holes 112*a* and 113*a* in which a shaft member 16 described later is inserted are formed so as to pass through.

[Second Rod-Like Member 12 and Sleeve 15]

The second rod-like member 12 is, as shown in FIG. 3, divided into a first part 121 on one end side (the right side of the figure) and a second part 122 on the other end side (the left side of the figure). The first part 121 and the second part 122 each have a round bar shape. While the first part 121 and the second part 122 may be made of a metal such as stainless steel or steel, they are preferably made of a titanium alloy (for example, 64 titanium alloy).

On both ends of the first part 121, screw parts 121*a* and 121*b* are formed.

The entire length of the second part 122 is formed as a screw shaft part 122*a*, and on the other end side of the screw shaft part 122*a*, a head part 122*b* having a wrench hole 122*c* is formed.

The first part 121 and the second part 122 are coupled by a sleeve 15 as a coupling member shown in FIG. 4. The sleeve 15 may be made of a metal such as stainless steel, steel, titanium alloy or pure titanium.

The sleeve 15 has a screw hole 15*a* formed on one end side and has a screw hole 15*b* formed on the other end side. The screw part 121*b* on the other end side of the first part 121 is screwed into the screw hole 15*a* of the sleeve 15, and one end of the screw shaft part 122*a* of the second part 122 is screwed into the screw hole 15*b*, whereby the first part 121 and the second part 122 are coupled through the sleeve 15.

On either one of the first rod-like member 11 and the second rod-like member 12 having the above-described structure, in order to prevent abnormal noise from being caused by contact when the instrument is played, at least a part that can be in contact is preferably covered with a resin or the like.

[Fixing Members 13 and 14 and Shaft Member 16]

To the one end part 112 of the first rod-like member 11, one end side fixing member 13 is attached, and to the other end part 113 thereof, the other end side fixing member 14 is attached. In this embodiment, since the one end side fixing member 13 and the other end side fixing member 14 have the same shape, the same size and the same structure, these will be explained as the fixing members 13 and 14 in the following description.

While the sleeve 15 may be made of a metal such as stainless steel, steel or titanium alloy, the fixing members 13 and 14 are preferably made of pure titanium.

As shown in FIG. 5A, the grooves 13*c* and 14*c* being U-shaped in side view are formed, and these U-shaped grooves 13*c* and 14*c* are fitted on the one end part 112 and the other end part 113 of the first rod-like member 11 formed in angular shape. Moreover, screw holes 13*a* and 14*a* are formed from one end surfaces toward the other end surfaces of the fixing members 13 and 14 so that the screw shaft part 122*a* of the second part 122 can be screwed therein.

Further, screw holes 13*b* and 14*b* in which the shaft member 16 is inserted so as to cross the U-shaped grooves 13*c* and 14*c* are formed so as to pass through in a direction intersecting the screw holes 13*a* and 14*a*.

[Coupling Structure of First Part 121, Second Part 122, Sleeve 15 and Fixing Member 13]

Regarding the parts indicated by the dot-and-dash-line circles of reference designations I, II and III of FIG. 1, reference designation I indicates the part where one end part of the first part 121 and the fixing member 13 are coupled, reference designation II indicates the part where the other end part of the first part 121 and one end part of the sleeve 15 are coupled, and reference designation III indicates the part where one end part of the screw shaft part 122*a* of the second part 122 and the other end part of the sleeve 15 are coupled.

The screw parts 121*a* and 121*b* are formed on both ends of the first part 121, the screw hole 13*a* is formed on the fixing member 13, the screw holes 15*a* and 15*b* are formed on both ends of the sleeve 15, and the screw parts 121*a* and 121*b* and the screw shaft part 122*a* can be screwed into the screw holes 13*a*, 15*a* and 15*b*.

Under a condition where the above-mentioned components are screwed, in the part indicated by reference designation II and the part indicated by reference designation III, the first part 121 and the sleeve 15, and the second part 122 and the sleeve 15 are fixed by brazing, welding or the like; then, the rotation of the second part is transmitted to the first member 121 through the sleeve 15 to move the first part 121 screwed in the screw hole 13*a* of the fixing member 13 by the screw part 121*a*, back and forth with respect to the fixing member 13.

According to this coupling structure, by rotating the second rod-like member 12, the part that moves back and forth by the screwing is two of the part where the fixing member 14 and the screw shaft part 122*a* of the second part 122 are screwed and the part indicated by reference designation I, so that the load and the displacement amount at the time of the back-and-forth movement are distributed to two parts.

In the part indicated by reference designation I and the part indicated by reference designation III, the first part 121 and the fixing member 13, and the second part 122 and the sleeve 15 are fixed by brazing, welding or the like; then, the rotation of the second part is transmitted to the sleeve 15 to move the first part 121 screwed in the screw hole 15*a* by the screw part 121*b*, back and forth with respect to the sleeve 15.

In the part indicated by reference designation I and the part indicated by reference II, the first part 121 and the fixing member 13, and the sleeve 15 are fixed by brazing, welding or the like; then, by the rotation of the second part, the second member 122 screwed in the screw hole 15*b* of the sleeve 15 by the screw shaft part 122*a* is moved back and forth with respect to the sleeve 15.

With the coupling structure as described above, the second rod-like member 12 is increased or decreased in length by rotation. In this coupling structure, by rotating the second rod-like member 12, the part that moves back and forth by the screwing is also two of the part where the fixing member 14 and the screw shaft part 122*a* of the second part 122 are screwed and the part indicated by reference designation II or the part indicated by reference designation III, so that the load and the displacement amount at the time of the back-and-forth movement are distributed to two parts.

The distribution of the load and the displacement amount at the time of the back-and-forth movement reduces the load acting on the parts where the fixing members 13 and 14 and the first rod-like member 11 are fixed, and makes the fixing parts not readily break, whereby the life of the deflection correction device 1 can be further increased.

[Assembly of Deflection Correction Device 1]

The deflection correction device 1 shown in FIG. 1 is formed by combining the components shown in FIGS. 2A to 6 by the following procedure.

First, the groove 13*c* of the fixing member 13 is fitted on the one end part 112 of the first rod-like member 11, and the groove 14*c* of the fixing member 14 is fitted on the other end part 113. Then, the shaft member 16 is inserted into the shaft holes 13*b*, 112*a*, 14*b* and 113*a* to couple the fixing members 13 and 14 to both ends of the first rod-like member 11. Thereafter, both ends of the first rod-like member 11, and the fixing members 13 and 14 and the shaft member 16 are fixed by brazing, welding or the like.

Then, the screw part 121*a* on one end side of the first part 121 of the second rod-like member 12 is screwed into the screw hole 13*a* of the fixing member 13, and the screw part 121*b* on the other end side is screwed into the screw hole 15*a* of the sleeve 15. The screw shaft part 122*a* of the second part 122 is screwed into the screw hole 14*a* of the fixing member 14, and one end of the screw shaft part 122*a* is screwed into the screw hole 15*b* of the sleeve 15.

The structure of coupling of the first part 121, the second part 122, the sleeve 15 and the fixing member 13 and the action thereof are as described with reference to reference designations I, II and III.

[Action of Deflection Correction Device 1]

The deflection correction device 1 assembled as described above works as follows:

A non-illustrated wrench is inserted into the wrench hole 122*c* (see FIG. 3) of the head part 122*b* of the second rod-like member 12 and rotated clockwise; then, by the screwing of the screw shaft part 122*a* and the screw hole 14*a* of the fixing member 14, the second part 122 of the second rod-like member 12 moves to one end side (the right side of the figure) to push the two fixing members 13 and 14 so as to move away from each other.

Moreover, the sleeve 15 rotates together with the second part 122 to let the screw part 121*b* of the first part 121 out from the screw hole 15*a* of sleeve 15, which also pushes the two fixing members 13 and 14 so as to move away from each other. Thereby, the first rod-like member 11 curves in an upwardly convex direction.

When the wrench is rotated counterclockwise, the first rod-like member 11 curves in a downwardly concave direction by an action opposite to the above-described one.

In the deflection correction device 1 of the present invention, since the fixing members 13 and 14 and both ends of the first rod-like member 11 are present as the structure where the one end part 112 and the other end part 113 having the same structure and the grooves 13*c* and 14*c* are fitted, even if deflection deformation is repeated, the load acting on the fixing parts of both is comparatively low, so that the life of the fixing parts can be increased. In addition, even if the fixing parts break due to fatigue, since both are coupled by the shaft member 16, the first rod-like member 11 and the second rod-like member 12 never separate immediately, which also enables the life of the deflection correction device 1 to further increase.

Moreover, by providing the structure where the second rod-like member 12 increases or decreases in length and making the load and the displacement amount distributed at both of the two fixing members 13 and 14, the fatigue breakage of the fixing parts can be suppressed over a long period of time, so that the life of the deflection correction device 1 can be further increased.

While a preferred embodiment of the present invention has been described, the present invention is not limited to the above-described one.

For example, while the second rod-like member 12 is divided into two parts and the first part 121 and the second part 122 are coupled by the sleeve 15 as a coupling member in the above description, for example, when the second rod-like member 12 can be assembled to the first rod-like member 11 through the fixing members 13 and 14 without being divided, it is not necessarily divided.

Moreover, while the screw hole 13*a* is formed on the fixing member 13 on one end side, the screw part 121*a* is formed on one end side of the second rod-like member 12 and these are screwed in the above description, when it is necessary to correct only either one of the convex and concave deflections, such screwing is not always necessary; for example, a structure may be adopted in which a hole is formed on the fixing member 13 and one end part of the second rod-like member 12 is inserted therein. In this case, a structure may be adopted in which the hole is bottomed so that one end of the second rod-like member 12 abuts on the bottom of the hole or in which the hole is a through hole so that one end part of the second rod-like member 12 partly protrudes from the through hole and the protruding part is, for example, crushed to prevent escape from the through hole.

INDUSTRIAL APPLICABILITY

The present invention is applicable to a wide range as a deflection correction device not only for a guitar, a base guitar, a ukulele, a violin, a cello, a mandolin and a contrabass but also for other stringed instruments, and is applicable to correction of deflection of not only the neck but also the body part and other parts and to correction of deflection of musical instruments other than stringed instruments. Further, the deflection correction device of the present invention is applicable to correction of not only the deflection due to a physical load such as the tension of the strings but also deflections due to changes in humidity, temperature, climate and the like.

BRIEF DESCRIPTION OF THE DRAWINGS

FIG. 1 is an assembly front view of the deflection correction device.

FIGS. 2A to 2C are related to the first rod-like member, FIG. 2A is a plan view thereof, FIG. 2B is a front view thereof, and FIG. 2C is an enlarged right side view thereof.

FIG. 3 is a front view of the second rod-like member.

FIG. 4 is a front view of the sleeve.

FIGS. 5A and 5B are related to the fixing members, FIG. 5A is a side view thereof, and FIG. 5B is a front view thereof.

FIG. 6 is a side view of the shaft member.

DESCRIPTION OF THE REFERENCE NUMERALS

1 Deflection correction device
11 First rod-like member
111 Body part
111*a* Hole
112 One end part
112*a* Shaft hole
113 Other end part
113*a* Shaft hole
12 Second rod-like member
121 First part
121*a* Screw part (one end side)
121*b* Screw part (the other end side)
122 Second part
122*a* Screw shaft part
122*b* Head part
112*c* Wrench hole
13, 14 Fixing member
13*a*, 14*a* Screw hole
13*b*, 14*b* Shaft hole
13*c*, 14*c* Groove
15 Sleeve
15*a* Screw hole (one end side)
15*b* Screw hole (the other end side)
16 Shaft member

The invention claimed is:

1. A neck deflection correction device for a stringed instrument, for correcting deflection of a neck of the stringed instrument, comprising:
- a first rod-like member provided in a length direction of the neck;
- one end side fixing member attached to one end side of the first rod-like member and another end side fixing member attached to another end side of the first rod-like member opposite to the one end side;
- a screw hole formed so as to pass through the another end side fixing member; and
- a second rod-like member provided along the first rod-like member, and having a screw shaft part screwed in the screw hole on the another end side, and one end part thereof attached to the one end side fixing member,
- wherein the one end side fixing member and the another end side fixing member include fitting grooves fitted on one end part and another end part of the first rod-like member; shaft holes passing through the one end part and the another end part of the first rod-like member from side surfaces of the one end side fixing member and the another end side fixing member; and shaft members inserted in the shaft holes,
- the one end side fixing member and the another end side fixing member are fixed to the one end part and the another end part together with the shaft members, and by screwing between the screw hole and the screw shaft part accompanying rotation of the second rod-like member, the one end side fixing member and the another end side fixing member are pushed in a direction such that the one end side fixing member and the another end side fixing member are drawn to each other or in a direction such that the one end side fixing member and the another end side fixing member are moved away from each other.

2. The neck deflection correction device for stringed instruments according to claim 1, wherein the one end part and the another end part of the first rod-like member are formed to be angular in cross section, and the fitting grooves of the one end side fixing member and the another end side fixing member are formed in a U shape that is fitted on the one end part and the another end part.

3. The neck deflection correction device for stringed instruments according to claim 1, wherein a screw hole is formed on the one end side fixing member, a screw part is formed on the one end part of the second rod-like member, the second rod-like member is screwed in the screw hole of the one end side fixing member, and by rotation of the second rod-like member, the one end side fixing member and the another end side fixing member are pushed in a direction such that the one end side fixing member and the another end side fixing member are drawn to each other or in a direction such that the one end side fixing member and the another end side fixing member are moved away from each other in cooperation with the screw hole of the another end side fixing member.

4. The neck deflection correction device for stringed instruments according to claim 1, wherein the second rod-like member is divided into a first part on one end side and a second part on another end side thereof, the first part and the second part are coupled by a coupling member, one end part of the first part is coupled to the one end side fixing member, and the second part where the screw shaft part is formed is screwed in the screw hole of the another end side fixing member.

5. The neck deflection correction device for stringed instruments according to claim 4, wherein the one end part of the first part is fixed to the one end side fixing member, and a screw part is formed on another end part of the first part and is screwed in a screw hole on one end side of the coupling member.

6. The neck deflection correction device for stringed instruments according to claim 4, wherein a screw part is formed on the one end part of the first part and is screwed in the screw hole formed on the one end side fixing member, and another end part of the first part is fixed to one end side of the coupling member.

7. The neck deflection correction device for stringed instruments according to claim 4, wherein the one end part of the first part is fixed to the one end side fixing member, another end part of the first part is fixed to one end side of the coupling member, and one end part of the screw shaft part of the second part is screwed in a screw hole formed on another end side of the coupling member.

8. The neck deflection correction device according to claim 1, wherein a covering member that prevents the first rod-like member and the second rod-like member from being in contact with each other is formed on at least one of the first rod-like member and the second rod-like member.

* * * * *